United States Patent [19]

Nachtkamp et al.

[11] 4,269,748

[45] May 26, 1981

[54] PROCESS FOR THE PREPARATION OF AQUEOUS POLYURETHANE DISPERSIONS AND SOLUTIONS

[75] Inventors: Klaus Nachtkamp, Bergisch-Gladbach; Josef Pedain, Cologne; Jurgen Grammel, Dormagen, all of Fed. Rep. of Germany

[73] Assignee: Bayer Aktiengesellschaft, Leverkusen, Fed. Rep. of Germany

[21] Appl. No.: 17,017

[22] Filed: Mar. 2, 1979

[30] Foreign Application Priority Data

Mar. 15, 1978 [DE] Fed. Rep. of Germany ....... 2811148

[51] Int. Cl.³ .............................................. C08L 75/12
[52] U.S. Cl. ...................... 260/29.2 TN; 260/29.4 R; 428/423.1
[58] Field of Search .................. 260/29.2 TN, 566 B; 528/46, 61

[56] References Cited

U.S. PATENT DOCUMENTS 3,420,800  1/1969  Haggis .................................. 260/75
4,066,591  1/1978  Scriven et al. ............... 260/29.2 TN

FOREIGN PATENT DOCUMENTS 47-49317 12/1972 Japan.

*Primary Examiner*—Theodore E. Pertilla
*Attorney, Agent, or Firm*—Gene Harsh; Lawrence S. Pope; Thomas W. Roy

[57]   ABSTRACT

The present invention relates to a process for the preparation of aqueous solutions or dispersions of polyurethanes, in which process prepolymers which have at least two free isocyanate groups and contain chemically-fixed hydrophilic groups and/or external emulsifiers which are not chemically fixed are reacted with chain lengthening agents in the aqueous phase, characterized in that the isocyanate prepolymer which is hydrophilically modified and/or contains an external emulsifier is mixed with chain lengthening agents selected from the group consisting of azines and hydrazones in the absence of water and the mixture obtained is then mixed with water. The present invention also relates to the dispersions or solutions which can be obtained by this process. Lastly, this invention relates to the use of the dispersions or solutions which can be obtained by this process for coating flexible substrates.

18 Claims, No Drawings

PROCESS FOR THE PREPARATION OF AQUEOUS POLYURETHANE DISPERSIONS AND SOLUTIONS

BACKGROUND OF THE INVENTION

Processes for the penetration of stable, aqueous polyurethane-polyurea dispersions by the incorporation of hydrophilic centers (so-called internal emulsifiers) into the macromolecular chain of the polymer are already known and are described for example in German Pat. Nos. 1,184,946 and 1,178,586; German Auslegeschrift No. 1,237,306; German Offenlegungsschriften Nos. 1,495,745; 1,595,602; 1,770,068 and 2,019,324; U.S. Pat. Nos. 3,388,087; 3,461,103; 3,480,592; 3,686,108; and 3,756,992; and by Dieterich et al. in Angew. Chem. 82, 53 (1970).

A distinction is to be made between those processes which require the use of organic solvents for the synthesis of the polyurethane/polyureas and the so-called solvent-free processes.

In the former case, high molecular weight polyurethanes are synthesized by polyaddition in organic solution, in other words in the homogeneous phase, before they are dispersed in water. Since the solid substance of the disperse particles is also to a high degree homogeneous, such dispersions give rise to polyurethane films of exceptionally high quality, sufficient, for example, for coating textiles.

This highly developed process, which includes both anionic and cationic and non-ionic emulsifier segments, has the disadvantage that organic solvents need to be distilled off and rectified by an expensive process. Connected with this is a poor volume/time yield in the manufacturing process. Moreover, the use of organic solvent as reaction medium increases the risk of explosion and fire in the production plant.

Another disadvantage of this process is that the chain lengthened, high molecular weight polyurethane-polyureas must be readily soluble in the organic solvent (e.g. acetone) so that a homogeneous, highly concentrated, but not too viscous, organic solution is obtained before dispersion in water. This condition is frequently not fulfilled in polymers which are required to yield exceptionally hard, high-melting and solvent-resistant coatings such as, for example, polyurethane-polyureas based on diphenyl methane diisocyanates which contain a high proportion of urea groups.

Among the known solvent-free methods of preparing polyurethane dispersions, there should also be mentioned the so-called melt dispersion process as described in German Offenlegungsschrift No. 1,770,068; U.S. Pat. No. 3,756,992 and by D. Dieterich and H. Reiff in Angew. Makromol. Chem. 76, 85 (1972).

In this process, an oligourethane which has been modified with ionic groups and contains acylated amino end groups is converted by means of formaldehyde into the corresponding oligourethane containing methylol end groups attached to acylated amino groups, and this oligourethane is then chain lengthened by a heat treatment which effects condensation of the reactive methylol end groups. This chain lengthening reaction may be carried out in the presence of water so that an aqueous dispersion of a polyurethane is directly obtained. The process is particularly suitable for the preparation of cationically-modified polyurethanes or the preparation of polyurethanes containing anionic carboxylate groups. The required combination of an isocyanate polyaddition reaction with the aforesaid chain lengthening reaction by way of polycondensable methylol groups which are attached to acyl amino end groups is a more complicated procedure than the usual isocyanate polyaddition by the prepolymer process in which prepolymers containing isocyanate groups are reacted with conventional chain lengthening agents such as water or diamines. This added complication in the process according to German Offenlegungsschrift No. 1,770,068 and U.S. Pat. No. 3,756,992 could be justified on the grounds that the process for the first time allowed polyurethane dispersions to be produced without the aid of special stirrers and without the aid of emulsifiers or solvents.

Another process described in German Offenlegungsschrift No. 2,446,440 and U.S. Pat. No. 4,108,814 concerns the solvent-free preparation of polyurethanes in aqueous dispersion. In this process, a prepolymer containing sulphonate groups and isocyanate groups is reacted with a difunctional isocyanate-reactive compound during the dispersion process, i.e. after dissolving the chain lengthening agent in the water of dispersion. it is also possible to add the chain lengthening agent after dispersion of the prepolymer in water.

The characteristic feature of this process is that the synthesis to a high molecular weight polyurethane urea takes place in a disperse, i.e. heterogeneous phase. The chain lengthening agent, i.e. diamine or water, is in the liquid phase and only penetrates to the center of the dispersed particles over a certain period of time. It is clear that the chain lengthening agent, i.e. the diamine dissolved in water, initially reacts in the outer regions of the dispersed particle. The concentration of chain lengthening agent, therefore, decreases progressively towards the center of the particle.

The solid particles of the dispersions obtained by this process are, therefore, not homogeneous, and the resulting polyurethane ureas have less mechanical strength than products produced in homogeneous solution and in some cases also have less resistance to hydrolysis.

In addition, it is virtually impossible to prepare highly concentrated dispersions, with a solids content of more than about 40% by the aforesaid process because at relatively high solids concentrations, the individual dispersed particles are joined together into larger aggregates by the chain lengthening agent which is situated mainly between the particles. This results in very high viscosities which are unsuitable for processing and the aqueous dispersions may even become pasty.

It was, therefore, an object of the present invention to provide a solvent-free or low solvent process by which polyurethanes with improved properties could be obtained in the aqueous phase, and the improvement was mainly to be achieved by the fact that the high molecular weight solid substances distributed in the liquid aqueous medium should be obtained by polyaddition in, as far as possible, a homogeneous phase.

It has now surprisingly been found that exceptionally high quality polyurethanes can be obtained in aqueous dispersions or solution if prepolymers which have isocyanate end groups and contain a hydrophilic group and/or an external emulsifier are mixed, before their dispersion in water, with an at least partially blocked chain lengthening agent which forms hydrazine under the hydrolytic influence of water, and the resulting mixture is then mixed with water. Another surprising observation is that polyurethanes which are substantially resistant to oxidation and light are obtained by this process even when isocyanate prepolymers which have aromatically bound isocyanate groups are used.

The compounds used in the process according to the invention which form hydrazine under the hydrolytic influence of water are azines and/or hydrazones. The reaction of isocyanates with azines has so far been disclosed only to the extent that it is known to give rise to Diels-Alder-type adducts at temperatures above about 100° C. as described in German Auslegeschrift No. 1,044,405 and by J. R. Bailey et al. in J. Amer. Chem. Soc. 39, 279, 1322 (1917). In the present invention, on the other hand, the reactants are reacted together in the presence of water at temperatures at which azines are inert towards isocyanates in the absence of water. It may, therefore, be assumed that a hydrolytic decomposition of the azine and hydrazone groups takes place with the aid of the isocyanates; this is surprising in the view of the fact that azines and hydrazones are normally hydrolyzed only in an acid medium as described by E. C. Gilbert in J. Amer. Chem. Soc. 51, 3394 (1929).

SUMMARY OF THE INVENTION

The present invention, thus, relates to a process for the preparation of aqueous solutions or dispersions of polyurethanes, in which process prepolymers which have at least two free isocyanate groups and contain chemically-fixed hydrophilic groups and/or external emulsifiers which are not chemically fixed are reacted with chain lengthening agents in the aqueous phase, characterized in that the isocyanate prepolymer which is hydrophilically modified and/or contains an external emulsifier is mixed with chain lengthening agents selected from the group consisting of azines and hydrazones in the absence of water and the mixture obtained is then mixed with water.

The present invention also relates to the dispersions or solutions which can be obtained by this process.

Lastly, this invention relates to the use of the dispersions or solutions which can be obtained by this process for coating flexible substrates.

DETAILED DESCRIPTION OF THE INVENTION

Isocyanate prepolymers containing at least two isocyanate end groups are used as starting materials for the process according to the invention. Difunctional isocyanate prepolymers are preferred. The isocyanate prepolymers used for the process according to the invention preferably contain one or more hydrophilic groups which render them soluble or dispersible in water, although hydrophobic isocyanate prepolymers could also be used provided external emulsifiers are added to render them soluble or dispersible in water. It would, of course, also be possible to increase the hydrophilic character of isocyanate prepolymers which contain chemically-fixed hydrophilic groups by the additional use of external emulsifiers.

From what has been said above, it will be clear that the exact chemical structure of the isocyanate prepolymers used in the process according to the invention is not critical. This means, in particular, that any isocyanate prepolymers hitherto used for the preparation of aqueous polyurethane dispersions or solutions may be employed. They are prepared by processes known in the art, which have been described, for example, in German Offenlegungsschriften Nos. 1,495,745; 1,495,847; 2,446,440 and b 2,340,512; U.S. Pat. Nos. 3,479,310 and 4,108,814, incorporated herein by reference, and British Pat. Nos. 1,158,088 and 1,076,688.

The isocyanate prepolymers with chemically-fixed hydrophilic groups, which are preferred for the process according to the invention, are prepared by methods analogous to those mentioned in the publications given as examples above. The following starting materials are, therefore, used for preparing these isocyanate prepolymers:

1. Any organic polyisocyanates, preferably diisocyanates, corresponding to the following formula $$Q(NCO)_2$$

in which Q represents an aliphatic hydrocarbon group having from 4 to 12 carbon atoms; a cycloaliphatic hydrocarbon group having from 6 to 15 carbon atoms; an aromatic hydrocarbon group having from 6 to 15 carbon atoms or an araliphatic hydrocarbon group having from 7 to 15 carbon atoms. The following are examples of these preferred diisocyanates; tetramethylene diisocyanate; hexamethylene diisocyanate; dodecamethylene diisocyanate; 1,4-diisocyanato cyclohexane; 1-isocyanato-3,3,5-trimethyl-isocyanato methyl cyclohexane; isophorone diisocyanate; 4,4'-diisocyanato dicyclohexyl methane; 4,4'-diisocyanato-dicyclohexyl propane-(2,2); 1,4-diisocyanato benzene; 2,4-diisocyanato toluene; 2,6-diisocyanato toluene; 4,4'-diisocyanato diphenyl methane; 4,4'-diisocyanato diphenyl propane-(2,2); p-xylylene diisocyanate; α,α,α'-,α'-tetramethyl-m- or -p-xylylene diisocyanate; and mixtures of these compounds.

Aromatic diisocyanates of the type exemplified above are preferably used for the process according to the invention.

The higher functional polyisocyanates known in polyurethane chemistry and modified polyisocyanates also known in polyurethane chemistry, such as polyisocyanates containing carbodiimide groups, allophanate groups, isocyanurate groups, urethane groups and/or biuret groups may, of course, also be used as part or all of the polyisocyanate component in the process according to the invention.

2. Any organic compounds having at least two isocyanate reactive groups, in particular organic compounds with molecular weights (the molecular weights of simple polyols such as ethylene glycol are known, those of the more complex compounds can be calculated from the hydroxyl content and the functionality or, if these figures are not available, can be determined by osmose) in the range of from about 62 to 10,000, preferably from about 1000 to 6000, which have a total of two amino groups, thiol groups, carboxyl groups and/or hydroxyl groups. The corresponding dihydroxyl compounds are preferably used. Compounds which have a functionality of from 3 or more in the isocyanate polyaddition reaction may also be used in minor quantities to produce a certain degree of branching, in the same way as the trifunctional or higher functional polyisocyanates already mentioned above.

The hydroxyl compounds used are preferably the hydroxy polyesters, hydroxy polyethers, hydroxy polythioethers, hydroxy polyacetals, hydroxy polycarbonates and/or hydroxy polyester amides already known in polyurethane chemistry.

Suitable hydroxyl polyesters include, for example, the reaction products of polyhydric, preferably dihydric alcohols to which trihydric alcohols may be added and polybasic, preferably dibasic, carboxylic acids. Instead of free polycarboxylic acids, the corresponding polycarboxylic acid anhydrides or polycarboxylic acid esters of lower alcohols or mixtures thereof may be used for the preparation of the polyesters. The polycarboxylic acids may be aliphatic, cycloaliphatic, aromatic and/or heterocyclic and they may be substituted, e.g. with halogen atoms, and/or unsaturated. The following are examples of suitable polycarboxylic acids, polycarboxylic acid anhydrides and polycarboxylic acid esters: succinic acid, adipic acid, suberic acid, azelaic acid, sebacic acid, phthalic acid, isophthalic acid, trimellitic acid, phthalic acid anhydride, tetrahydro phthalic acid anhydride, hexahydrophthalic acid anhydride, tetrachloro phthalic acid anhydride, endomethylene tetrahydro phthalic acid anhydride, glutaric acid anhydride, maleic acid, maleic acid anhydride, fumaric acid, dimeric and trimeric fatty acids such as oleic acid which may be mixed with monomeric fatty acids, dimethyl terephthalate and bis-glycol terephthalate.

The following are examples of suitable polyhydric alcohols: ethylene glycol, propolene glycol-(1,2) and -(1,3); butylene glycol-(1,4) and -(2,3); hexane diol-(1,6); octane diol-(1,8); neopentyl glycol; cyclohexane dimethanol (1,4-bis-hydroxymethyl cyclohexane); 2-methyl-1,3-propane diol; glycerol; trimethylol propane; hexane triol-(1,2,6); butane triol-(1,2,4); trimethylol ethane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols.

The polyesters may also contain a proportion of carboxyl end groups. Polyesters of lactones such as ε-caprolactone or hydroxyl carboxylic acids such as ω-hydroxy-caproic acid may also be used.

The polyethers used according to the invention, which preferably have two hydroxyl groups, are also known and are prepared, for example, by the polymerization of cyclic ethers such as ethylene oxide, propylene oxide, butylene oxide, tetrahydrofuran, styrene oxide or epichlorohydrin, either on their own, e.g. in the presence of boron trifluoride, or by the chemical addition of these epoxides, either as mixtures or successively, to starting components which have reactive hydrogen atoms, such as alcohols or amines, e.g. water, ethylene glycol, propyleneglycol-(1,3) or -(1,2), 4,4'-dihydroxydiphenyl propane or aniline.

Polyethers modified by vinyl polymers, e.g. the compounds obtained by the polymerization of styrene or acrylonitrile in the presence of polyethers (U.S. Pat. Nos. 3,383,351; 3,304,273; 3,523,093 and 3,110,695, all incorporated herein by reference, and German Pat. No. 1,152,536) are also suitable. The higher functional polyethers of which a proportion may be added are obtained analogously by the known method of alkoxylation of higher functional starting molecules such as ammonia, ethanolamine, ethylene diamine or sucrose.

Particularly to be mentioned among the polythioethers are the condensation products obtained by the reaction of thiodiglycol on its own and/or with other glycols, dicarboxylic acids, formaldehyde, amino carboxylic acids or amino alcohols. The products obtained may be polythio-mixed ethers, polythioether esters or polythio ether ester amides, depending on the cocomponents.

Suitable polyacetals include, for example, the compounds prepared from glycols such as diethylene glycol, triethylene glycol, 4,4'-diethoxy-diphenyl dimethyl methane, hexane diol and formaldehyde. Polyacetals suitable for the process according to the invention may also be prepared by the polymerization of cyclic acetals.

Suitable polycarbonates with hydroxyl groups are known, e.g. those prepared by the reaction of diols such as propane diol-(1,3), butane diol-(1,4) and/or hexane diol-(1,6), diethylene glycol, triethylene glycol or tetraethylene glycol with diaryl carbonates, e.g. diphenyl carbonate or phosgene.

Suitable polyester amides and polyamides include e.g. the predominantly linear condensates obtained from polyhydric saturated and unsaturated carboxylic acids or their anhydrides and polyvalent saturated and unsaturated amino alcohols, diamines, polyamines and mixtures thereof. Polyhydroxyl compounds already containing urethane or urea groups may also be used.

Low molecular weight polyols may also be used as all or part of the polyhydroxyl component, e.g. ethane diol, propane diol-(1,2) and -(1,3), butane diol-(1,4) and -(1,3), pentane diols, hexane diols, trimethylol propane, hexane triols, glycerol and pentaerythritol.

Further examples of the above-mentioned polyisocyanate and hydroxyl compounds to be used in the process according to the invention have been described e.g. in High Polymers, Vol. XVI, "Polyurethanes, Chemistry and Technology" by Saunders-Frisch, Interscience Publishers, New York, London, Vol. I, 1962, pages 32–42 and pages 44–54, and Vol. II, 1964, pages 5–6 and 198–199, and in Kunststoff-Handbuch, Vol. VII, Vieweg-Höchtlen, Carl Hanser-Verlag, Munich 1966, e.g. on pages 45–71, all incorporated herein by reference.

3. Starting components which contain chemically fixed hydrophilic groups and which are preferably monofunctional, or most preferably difunctional, in isocyanate addition reactions. Examples of compounds of this type may be found in the publications mentioned above in connection with the preparation of aqueous polyurethane dispersions or solutions, i.e. for example diisocyanates, diamines or dihydroxyl compounds containing ionic or potential ionic groups, and diisocyanates or glycols containing polyethylene oxide units. Among the preferred hydrophilically-modified starting components may be included the aliphatic diols containing sulphonate groups according to German Offenlegungsschrift No. 2,446,440 and U.S. Pat. No. 4,108,814, incorporated herein by reference, the cationic or anionic internal emulsifiers which may be chemically fixed according to German Offenlegungsschrift No. 2,651,506, and copending U.S. application Ser. No. 849,690, filed Nov. 8, 1977, allowed incorporated herein by reference, and the monofunctional polyethers capable of being chemically fixed, which are also described in German Offenlegungsschrift No. 2,651,506 and copending U.S. application Ser No. 849,690 allowed.

When isocyanate prepolymers are prepared by the known methods of the art, the reactants are generally used in proportions corresponding to a ratio of isocyanate groups to isocyanate reactive hydrogen groups, preferably hydroxyl groups, of from about 1.05 to 10, preferably from about 1.1 to 3.

The sequence in which the individual reactants are added is to a large extent optional. The hydroxyl compounds may be mixed and the polyisocyanate added thereto or the mixture of hydroxyl compounds may be added to the polyisocyanate component or the hydroxyl compounds may be added individually one after another.

The isocyanate prepolymers are preferably prepared solvent-free at about 30° to 190° C., preferably at about 50° to 120° C. They may, of course, also be prepared in the presence of organic solvents although it is one of the main advantages of the process according to the invention that solvents can be dispensed with. Suitable solvents which may be added in quantities of up to about 30% by weight, based on the solids content, for example in order to lower the viscosity of exceptionally high melting prepolymers, would be, for example, acetone, methyl ethyl ketone, ethyl acetoacetate, dimethyl formamide and cyclohexanone.

The nature and proportions of the starting materials used for the preparation of the isocyanate prepolymers are otherwise preferably chosen so that the isocyanate prepolymers (a) have an average isocyanate functionality of from about 1.8 to 2.2, preferably about 2;

(b) contain from about 0 to 100, preferably from about 0.1 to 100 and most preferably from about 0.5 to 50 milliequivalents of cationic or anionic chemically fixed groups per 100 g of solids content;

(c) contain from about 0 to 30, preferably from about 0.5 to 30 and most preferably from about 1 to 20% by weight, based on the total weight of the prepolymer, of ethylene oxide units built into side chains or in end positions and/or within the main chain in a polyether segment, and (d) have a number average molecular weight of from about 500 to 10,000, preferably from about 800 to 4000.

As already mentioned above, the preferred isocyanate prepolymers include those which have either ionic groups of the type mentioned under (b), i.e. in particular $-COO^-$, $-SO_3^-$ or $=N^+=$, or non-ionic groups of the type mentioned under (c) or both ionic and non-ionic groups of the type mentioned. However, the process according to the invention may also be carried out using isocyanate prepolymers which have been prepared without any of the hydrophilic starting components mentioned above so that they do not contain any of the groups mentioned under (b) or (c) above. When such isocyanate prepolymers are used, which otherwise also have the properties mentioned under (a) and (d) above, it is essential to use external emulsifiers when carrying out the process of the invention. Suitable emulsifiers of this kind have been described, for example, by R. Heusch in "Emulsionen", Ullmann, Volume 10, pages 449-473, Weinheim 1975, incorporated herein by reference. Among these are ionic emulsifiers, e.g. alkali metal and ammonium salts of long chain fatty acids or long chain aryl (alkyl) sulphonic acids, as well as nonionic emulsifiers, e.g. ethoxylated alkyl benzenes having an average molecular weight of from about 500 to 10,000.

These external emulsifiers are thoroughly mixed with the isocyanate prepolymers before the process according to the invention is carried out. They are generally used in quantities of from about 1 to 30% by weight, preferably from about 5 to 20% by weight, based on the weight of the isocyanate prepolymer. Even when hydrophilically modified isocyanate prepolymers are used, their hydrophilic character may be enhanced by the addition of such external emulsifiers, although this is generally not necessary.

In addition to the isocyanate prepolymers, compounds which form hydrazine under the hydrolytic influence of water are used in the process according to the invention. These compounds are reaction products of hydrazine with carbonyl compounds in an equivalent ratio of hydrazinic $NH_2$-groups to carbonyl groups of from about 1:1 to 2:1. These compounds are therefore either azines, i.e. aldazines or ketazines, or hydrazones, i.e. aldehyde hydrazones or ketone hydrazones, or any mixtures of such compounds. The $=C=N$-group present in the azines or hydrazones is substantially inert towards isocyanate groups at room temperature in the absence of moisture and begins to react with isocyanate groups only on contact with water, presumably with intermediate release of the hydrazinic $-NH_2$-group.

From the fact that hydrazones may also be used in the process according to the invention, it is clear that not all of the hydrazinic $-NH_2$-groups need be blocked for carrying out the process according to the invention. It is important only that at least one $-NH_2$-group is present in the blocked form in each chain lengthening agent molecule.

The preparation of ketazines, aldazines, ketone hydrazones are aldehyde hydrazones is already known in the art and has been described, for example, in Houben-Weyl, Methoden der Organischen Chemie, Volume X/2, 1967, pages 89–112, incorporated herein by reference.

The azines and hydrazones to be used according to the invention may be prepared from any organic compounds which have at least one ketone or aldehyde group and are otherwise inert under the reaction conditions, although it is preferred to use aliphatic aldehydes or ketones having a total of from about 2 to 18, preferably from about 3 to 6 carbon atoms, or cycloaliphatic aldehydes or ketones having from about 5 to 18, preferably about 5 or 6 carbon atoms. Examples of suitable aldehydes and ketones include acetaldehyde, propionaldehyde, butyraldehyde, isobutyraldehyde, acetone, methyl ethyl ketone, methyl isobutyl ketone, diisopropyl ketone, cyclohexanone and cyclopentanone. Aromatic aldehydes and ketones such as benzaldehyde, acetophenone and benzophenone are also suitable but less preferred.

The preferred azines and hydrazones used in the process according to the invention thus correspond to the following formulae

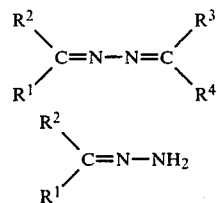

in which
R$^1$, R$^2$, R$^3$ and R$^4$, which may be the same or different, represent hydrogen, aliphatic hydrocarbon groups having from 1 to 17, preferably from 1 to 5, carbon atoms, or the groups R$^1$ and R$^2$ and/or R$^3$ and R$^4$ may, together with the carbon atom of the main structure, form a cycloaliphatic ring with from 5 to 18, preferably 5 or 6 carbon atoms.

The ketone derivatives are preferred to the aldehyde derivatives. If aldehyde derivatives are used, they are preferably based on aldehydes having at least four carbon atoms.

To carry out the process according to the invention, the isocyanate prepolymers, which may contain external emulsifiers, are mixed with the above-mentioned azines and/or hydrazones. The proportion of isocyanate prepolymer to azine and/or hydrazone is generally chosen so that the equivalent ratio of (isocyanate groups of the prepolymer) to (free+blocked hydrazinic —$NH_2$-groups) is in the range of from about 4:1 to 1:1.5, preferably from about 2:1 to 1:1.25 and more particularly from about 1.3:1 to 1:1.2. The two components are mixed at temperatures from about −20° to 100° C., preferably from about 15° to 60° C. If the isocyanate prepolymers have an exceptionally high melting point so that they cannot be mixed at temperatures in the preferred range, organic solvent such as acetone, methyl ethyl ketone, ethyl acetate, dimethyl formamide or cyclohexanone may, of course, be added to lower the viscosity but only in a quantity necessary to allow the isocyanate prepolymer to be stirred and not, as in earlier processes, to form a homogeneous solution of the chain lengthened polyurethane. Solvent quantities of up to about 30% by weight, based on the solids content of the prepolymer, are generally sufficient for this purpose.

When hydrazones are used, a reaction between isocyanate groups and $NH_2$-groups may set in when they are mixed with the isocyanate prepolymer, and this may cause a rise in temperature, but not significant increases in viscosity. It is nevertheless advisable to mix the isocyanate prepolymer with azine and/or hydrazone only shortly before the reaction mixture is dispersed in water. In addition to azines and/or hydrazones, other blocked chain lengthening agents such as ketimines or aldimines may, of course, also be used in the process according to the invention.

The next step in the process of the invention consists of mixing the mixture with water to prepare the aqueous solution or dispersion and at the same time hydrolyze the azine and/or hydrazone. The quantity of water used for this step is calculated to provide as high a solids content as possible in the solutions or dispersions. They may easily be prepared with solids contents of from about 40 to 60% by weight and can then easily be diluted with water if desired. The water is preferably added in one shot, but may be added gradually as desired. On the other hand, the mixture of prepolymer and azine and/or hydrazone may be mixed with water by introducing said mixture into the aqueous phase or a continuous method may be used by which prepolymer and blocked hydrazine are first mixed with each other and then with water in a suitable mixing apparatus. The water is used at a temperature of from about 0° to 90° C., preferably from about 15° to 60° C.

The dispersions obtained are very finely divided, the particles preferably measuring from about 20 to 200 nm although they may, of course, be larger.

The dispersions prepared by the process according to the invention may, of course, be further modified in a known manner in a last step of the process. If, for example, the isocyanate groups and free and blocked hydrazinic —$NH_2$-groups were used in an equivalent ratio of from about 1:1 to 1:1.5, the resulting polyurethane with semicarbazide end groups can be further modified, for example with mono- or polyisocyanates in a free or masked form or chemical compounds containing epoxide groups. This subsequent modification of the aqueous polyurethane ureas may be carried out to obtain certain properties; for example, the products may be rendered hydrophobic by a reaction with stearyl isocyanate.

The question as to whether the polyurethanes are obtained as solutions or as dispersions in water in the process according to the invention depends mainly on the molecular weight and the hydrophilic character of the dissolved or dispersed particles, and this in turn can be adjusted by suitable choice of the nature and proportions of the starting materials according to the known principles of polyurethane chemistry, especially when preparing the isocyanate prepolymers. Thus, for example, if an isocyanate prepolymer having an average isocyanate functionality slightly below two is used, the polyaddition reaction stops before a very large molecular weight is reached.

The polyurethanes obtained as aqueous dispersions or solutions by the process according to the invention are equal in quality to known polyurethanes prepared in organic solvents. Films formed from them have excellent mechanical strength and resistance to hydrolysis and may be used in various fields.

The dispersions and solutions according to the invention are particularly suitable for the manufacture of adhesives and coatings both for flexible and for rigid substrates, depending on the nature and structure of the polyurethane. As substances which can be applied to flexible substrates, they are particularly suitable for coating textiles, dressing leather and coating paper and for use as glass fiber layers. As substances which can be applied to rigid substrates, they can be used to produce rigid and resistant coatings which are suitable, for example, as lacquers on wood or metal, and as such they may, if desired, subsequently be cross-linked with formaldehyde, urea or melamine resins. The dispersions according to the invention may also be mixed with aqueous polyacrylate dispersions, and these mixtures may also be used for the fields of application mentioned above.

The percentages given in the Examples which follow are percentages by weight unless otherwise indicated.

EXAMPLES

EXAMPLE 1

Reaction mixture:
1479 g polyester of adipic acid and diethylene glycol (molecular weight 2550)
200 g polypropylene oxide polyether started on propane diol-(1,2) (molecular weight 1000)
85.8 g polyether of 15% propylene oxide and 85% ethylene oxide started on n-butanol (molecular weight 2145)
85.0 g propoxylated adduct of 2-butene diol-(1,4) and $NaHSO_3$ (molecular weight 425)
9.3 g methyl p-toluene sulphonate
313.2 g diisocyanato toluene (mixture of 80% of 2,4-and 20% of 2,6-isomer)
71.7 g acetone azine (bis-isopropylidene-hydrazine)
3290 g deionized water Method:
Methyl p-toluene sulphonate is added to the mixture of polyester, the two polyethers and bisulphite adduct which has been dehydrated at 120° C. in order to bind any alkali present in the bisulphite adduct, and diisocyanato toluene is then added at 60° C. The reaction mixture is stirred at 80° C. until it has an isocyanate content of 3.1%. It is then left to cool to 50° C. and acetone azine is stirred into the moderately viscous prepolymer melt, during which time the temperature falls slightly and the viscosity also continues to fall.

Water is then run in while the mixture is vigorously stirred, and stirring is then continued for a further two hours. The resulting dispersion has a solids content of 40% and a Ford cup viscosity (4 mm nozzle) of 18 seconds. The dispersion shows the Tyndall effect in transmitted light.

It dries to form clear, soft elastic films. It is suitable as bonding coat for coating flexible substrates. When polyurethane top coats are bonded by means of the dispersion prepared according to Example 1, the textile coatings obtained have a soft handle and very good resistance to washing and dry cleaning. The dispersion is also suitable for priming leather dressings.

EXAMPLE 2

A prepolymer is prepared according to Example 1. When it has cooled to 50° C., 89.6 g of methyl ethyl ketazine are stirred in and the mixture is dispersed as described in Example 1. The resulting dispersion is a thin liquid with a Tyndall effect.

EXAMPLE 3

A prepolymer is prepared according to Example 1. When it has cooled to 50° C., 89.6 g of isobutyraldazine are stirred in and the mixture is dispersed as described in Example 1. The resulting dispersion is highly fluid and shows a Tyndall effect.

EXAMPLE 4

A prepolymer is prepared as described in Example 1. When it has cooled to 50° C., 46.1 g of acetone hydrazone are added dropwise within 30 minutes. The temperature and viscosity rise slightly but there is no risk of gelling.

The mixture is then dispersed as described in Example 1. The resulting dispersion has a Ford cup viscosity (4 mm nozzle) of 17 seconds and shows a Tyndall effect in transmitted light. The dispersion dries to form films which are similar in their properties to the product produced according to Example 1.

EXAMPLE 5

Reaction mixture:
1710 g polyester of adipic acid and butane diol (molecular weight 2250)
85.5 g polyether of 15% propylene oxide and 85% ethylene oxide started on n-butanol (molecular weight 2145)
93.5 g propoxylated adduct of 2-butene diol-(1,4) and NaHSO$_3$ (molecular weight 425)
600 g acetone
550 g 4,4'-diisocyanato diphenyl methane
125.2 g acetone azine
3700 g of deionized water Method:
To a mixture of polyester, polyether and bisulphite adduct which has been dehydrated at 120° C., 600 g of anhydrous acetone are added to lower the viscosity of the prepolymer which is to be formed. 4,4'-diisocyanato diphenyl methane is then added and the mixture is stirred at 60° C. until it has an isocyanate content of 3.3%. The resulting prepolymer is cooled to 20° C. Acetone azine is then added; no reaction can be seen to take place between the azine and the isocyanate groups. The reaction mixture is then dispersed by the addition of water with vigorous stirring. The resulting dispersion has an acetone content of about 10%. It may be freed from acetone by vacuum distillation, and then has a solids content of 40%. The Ford cup viscosity (4 mm nozzle) is 14 seconds. The dispersion shows a Tyndall effect in transmitted light.

The dispersion is suitable for use as top coat for coating flexible substrates, particularly for textile coating.

It dries to form clear, colorless elastic films which are characterized by their advantageous mechanical properties and resistance to hydrolysis and, compared with conventional polyurethanes based on aromatic isocyanates, they have a markedly better resistance to U.V. radiation and do not yellow when heated (e.g. 10 minutes at 150° C.).

|  | Initial value | After 14 days hydrolysis test | After 400 hours Xeno test |
|---|---|---|---|
| Tensile strength (DIN 53504) | 38.0 MPa | 37.5 MPa | 21.7 MPa |
| Elongation at break (DIN 53504) | 520% | 440% | 250% |

The resistance to tearing after 400 hours exposure in the Xeno test is about 57% of the initial value.

EXAMPLE 6 (Comparison Example)

A polyurethane prepared from 2250 g of a polyester of adipic acid and butane diol (molecular weight 2550), 216 g of butane diol-(1,4) and 850 g of 4,4'-diisocyanato diphenyl methane in a 35% dimethyl formamide/toluene solution by a known process gives rise to films which have the following properties:

|  | Initial value | After 14 days hydrolysis test | After 400 hours Xeno test |
|---|---|---|---|
| Tensile strength (DIN 53504) | 44.8 MPa | 44.0 MPa | 4.0 MPa |
| Elongation at break (DIN 53504) | 660% | 570% | 300% |

The resistance to tearing of the films after 400 hours exposure in the Xeno test is less than 10% of the initial value.

EXAMPLE 7

Reaction mixture:
558 g polyester of adipic acid and butane diol (molecular weight 900)
42.5 g polyether of 15% propylene oxide and 85% ethylene oxide started on n-butanol (molecular 2145)
29.8 g propoxylated adduct of 2-butene diol-(1,4) and NaHSO$_3$ (molecular weight 425)
300 g acetone
450 g 4,4'-diisocyanato diphenyl methane
27 g butane diol-(1,4)
71.7 g acetone azine
1690 g deionized water Method:
To a mixture of polyester, polyether and bisulphite adduct which has been dehydrated at 120° C., 300 g of anhydrous acetone are added in order to lower the viscosity of the prepolymer to be formed. 4,4'-diisocyanato diphenyl methane is then added and the mixture is stirred at 60° C. until it has an isocyanate content of 6.7%. After the addition of butane diol, the mixture is left to react at the same temperature until it has an isocyanate content of 4.8%. The prepolymer obtained is cooled to 20° C. Acetone azine is then added; no reaction is observed to take place between the azine and the isocyanate groups. The mixture is then dispersed by the addition of water with vigorous stirring. The resulting dispersion has an acetone content of about 10%. It may be freed from acetone by vacuum distillation, after which it has a solids content of 40%. The Ford cup viscosity (4 mm nozzle) is 15 seconds. The dispersion shows a Tyndall effect in transmitted light.

The dispersion is suitable for coating flexible substrates. It dries to form clear, colorless elastic films which do not yellow even at elevated temperatures (e.g. 150° C., 10 minutes). The polymer is characterized by its high melting point (about 220° C.), resistance to hydrolysis and a substantially higher resistance to U.V. radiation compared with that of conventional polyurethane based on aromatic isocyanates.

|  | Initial value | After 14 days hydrolysis test | After 400 hours Xeno test |
|---|---|---|---|
| Tensile strength (DIN 53504) | 34.7 MPa | 33.5 MPa | 18.7 MPa |
| Elongation at break (DIN 53504) | 310% | 260% | 160% |

The resistance to tearing after 400 hours exposure in the Xeno test is about 54% of the initial value.

EXAMPLE 8

A dispersion is prepared according to Example 7 but with only 920 g of water. The solids content after removal of the acetone by distillation is 55%. The dispersion has a Ford cup viscosity (4 mm nozzle) of 56 seconds and show a pronounced Tyndall effect. It is stable in storage for more than 5 months.

EXAMPLE 9

A prepolymer is prepared as in Example 7. When it has cooled to 20° C., 46.1 g of acetone hydrazone are added within 30 minutes. The temperature and viscosity rise slightly but there is no risk of gelling. The mixture is then dispersed as described in Example 7. The solids content after removal of the acetone by distillation is 40%. The Ford cup viscosity (4 mm nozzle) is 21 seconds. The dispersion shows a Tyndall effect in transmitted light. It dries to form films which are similar in their properties to the product prepared according to Example 7.

EXAMPLE 10 (Comparison Example)

A prepolymer is prepared according to Example 7. When it has cooled to 20° C., 125 g of a mixture of hydrazine hydrate and acetone prepared in a molar ratio of 1:2 are added. When the mixture is initially stirred in, the prepolymer remains clear, but after a short time an exothermic reaction takes place which is accompanied by the formation of cloudiness and increase in viscosity. The product is completely gelled after about 5 to 10 minutes. If dispersion in water is carried out before gelling sets in, the dispersion is coarse and without Tyndall effect and it sediments when left to stand.

This example demonstrates that it is necessary to use anhydrous azines or hydrazones for carrying out the process according to the invention.

EXAMPLE 11 (Comparison Example)

A prepolymer is prepared according to Example 7. 1400 g of acetone are added when the prepolymer has cooled to 20° C., and 32 g of hydrazine hydrate are then introduced dropwise into the vigorously stirred solution. The product, which is initially clear, becomes progressively more cloudy and inhomogeneous but still remains easily stirrable. The product is dispersed in water as described in Example 8 and the acetone is distilled off under vacuum. The resulting dispersion is coarse and sediments completely within a short time.

This Example illustrates that the classical "acetone process" cannot be used to obtain dispersions of polyurethane polyureas which are insoluble in acetone, for example owing to their high diisocyanato diphenyl methane content, and, therefore, precipitate in the chain lengthening reaction. The process according to the invention, on the other hand, which is based on the use of azines, allows such dispersions to be prepared (see Example 7).

EXAMPLE 12

Reaction mixture:
400 g polyester of phthalic acid and ethane diol (molecular weight 2000)
1050 g polyester of phthalic acid, adipic acid and ethane diol (molecular weight 1750)
85.5 g polyether of 15% propylene oxide and 85% ethylene oxide started on n-butanol (molecular weight 2145)
76.6 g propoxylated adduct of 2-butene diol-(1,4) and NaHSO$_3$ (molecular weight 425)
500 g acetone
550 g 4,4'-diisocyanato diphenyl methane
107.5 g acetone azine
3290 g deionized water
Method:
The mixture of the two polyesters, the polyether and bisulphite adduct, dehydrated to 120° C., is diluted with 500 g of anhydrous acetone. 4,4'-diisocyanato diphenyl methane is then added and the mixture is heated with stirring to 60° C. until it has an isocyanate content of 3.8%. It is then cooled to 20° C. and acetone azine is stirred in. The reaction mixture is then dispersed by the addition of water with vigorous stirring. The resulting dispersion has an acetone content of about 8%; it may be freed from acetone by vacuum distillation and then has a solids content of 40%.

The Ford cup viscosity (4 mm nozzle) is 15 seconds. The dispersion shows a Tyndall effect in transmitted light. It dries to form clear, colorless films and is suitable for coating paper. Pendulum hardness 90 seconds.

The films show no signs of yellowing after 10 minutes heating at 150° C.

EXAMPLE 13

Reaction mixture:
306 g polyester of adipic acid and butane diol (molecular weight 900)
220 g polypropylene oxide polyether started on bisphenol A (molecular weight 550)
42.7 g polyether of 15% propylene oxide and 85% ethylene oxide started on n-butanol (molecular weight 2145)

42.5 g propoxylated adduct of 2-butene diol-(1,4) and NaHSO₃ (molecular weight 425)
300 g acetone
450 g 4,4'-diisocyanato diphenyl methane
13.4 g trimethylol propane
84.8 g acetone azine
1650 g deionized water
Method:

A mixture of the polyester, the two polyethers and the bisulphite adduct which has been dehydrated at 120° C. is diluted with 300 g of anhydrous acetone to lower the viscosity of the prepolymer to be formed. 4,4'-diisocyanato diphenyl methane is then added and the mixture is stirred at 60° C. until it has an isocyanate content of 5.8%. After the addition of trimethylol propane, the mixture is left to react at the same temperature until it has an isocyanate content of 4.9%. The resulting prepolymer is cooled to 20° C. Acetone azine is then added and the mixture is dispersed by the addition of water with vigorous stirring. The resulting dispersion has an acetone content of about 10%. It may be freed from acetone by vacuum distillation, after which it has a solids content of 40%. The Ford cup viscosity (4 mm nozzle) is 18 seconds. The dispersion shows a Tyndall effect in transmitted light. It dries to form clear, colorless hard films and may be used as air drying lacquer for wood.

A board of beechwood is sealed with the dispersion diluted to a solids content of 20%. After 5 minutes drying at 80° C., the surface is sanded down in the direction of the fibers and then painted with the undiluted dispersion. A clear, glossy, dry lacquer is obtained after drying (2 hours at room temperature). It is subjected to the following tests:

(1) A wad of cotton wool soaked with water is kept on the lacquered wooden surface for 24 hours at room temperature, covered with a protective cap to prevent its drying out. After this test, the lacquer surface shows no signs of softening or cloudiness or any other signs of hydrolysis.

(2) The test is repeated using a 50% aqueous ethyl alcohol solution. Slight cloudiness of the lacquer coat may be observed after 24 hours, but this disappears completely within a few minutes after removal of the wad of cotton wool, leaving no trace behind, and there is no sign of any softening of the lacquer.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of aqueous solutions or dispersions of polyurethanes prepared by the reaction of prepolymers which have at least two free isocyanate groups and contain either chemically fixed hydrophilic groups and/or external emulsifiers which are not chemically fixed, with chain lengthening agents in the aqueous phase, characterized in that the isocyanate prepolymer which is hydrophilically modified and/or contains an external emulsifier is mixed with azine chain lengthening agents in the absence of water, and the resulting mixture is then mixed with water before significant increases in viscosity occur.

2. The process according to claim 1, characterized in that the nature and proportions of the reactants are chosen to provide from about 0.25 to 1.5 isocyanate-reactive, at least partially blocked hydrazinic-NH₂ groups of the chain lengthening agent for each isocyanate group of the isocyanate group-containing prepolymer.

3. Dispersions or solutions obtainable according to claim 1.

4. Coatings prepared by a process which comprises applying the solutions or dispersions of claim 1 to a substrate.

5. Films prepared from the solutions or dispersions of claim 1.

6. Lacquers prepared from the solutions or dispersions of claim 1.

7. A process for the preparation of aqueous solutions or dispersions comprising
(A) mixing in the absence of water
   (i) a hydrophilic isocyanate prepolymer having
      (a) an average isocyanate functionality of from about 1.8 to 2.2;
      (b) its hydrophilic properties contributed by dispersing centers selected from the group consisting of chemically incorporated cationic or anionic groups present in from about 0 to 100 milliequivalents per 100 g of isocyanate prepolymer, chemically incorporated ethylene oxide units present in the isocyanate prepolymer in from about 0 to 30% by weight, based on the weight of the isocyanate prepolymer, and external emulsifiers present in about 0 to 30% by weight, based on the weight of the isocyanate prepolymer; and
      (c) an average molecular weight of from about 500 to 10,000
   (ii) with an azine chain lengthening agent which forms hydrazine under the hydrolytic influence of water to form a mixture and
(B) mixing the mixture of (A), before significant increases in viscosity occur, with water to release the hydrazine and chain lengthen the prepolymer.

8. The process of claim 7 wherein the hydrophilic isocyanate prepolymer has
   (a) an average isocyanate functionality of about 2,
   (b) its hydrophilic properties contributed by dispersing centers selected from the group consisting of chemically incorporated cationic or anionic groups present in from about 0.1 to 100 milliequivalents per 100 g of isocyanate prepolymer, chemically incorporated ethylene oxide units present in the isocyanate prepolymer in from about 0.5 to 30% by weight, based on the weight of the isocyanate prepolymer, and external emulsifiers present in from about 1 to 30% by weight, based on the weight of the isocyanate prepolymer, and
   (c) an average molecular weight of from about 800 to 4000.

9. The process of claim 7 wherein the azines have the formula

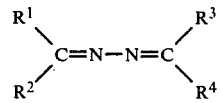

wherein
$R^1$, $R^2$, $R^3$ and $R^4$, which may be the same or different, represent hydrogen, aliphatic hydrocarbon groups having from 1 to 17 carbon atoms, or $R^1$ and $R^2$ and/or $R^3$ and $R^4$, together with the >C= carbon atom, may form a cycloaliphatic ring having from 5 to 18 carbon atoms.

10. The process of claim 7 wherein the equivalent ratio of isocyanate groups of hydrophilic isocyanate prepolymer (i) to free and blocked hydrazinic-$NH_2$-groups of chain lengthening agent (ii) is from about 4:1 to 1:1.5.

11. The process of claim 7 wherein hydrophilic isocyanate prepolymer (i) is mixed with chain lengthening agent (ii) at a temperature of from about −20° to 100° C.

12. The process of claim 11 wherein hydrophilic isocyanate prepolymer (i) is mixed with chain lengthening agent (ii) in the presence of up to about 30% by weight of an organic solvent, based on the weight of the hydrophilic isocyanate prepolymer.

13. The process of claim 7 wherein the mixture of hydrophilic isocyanate prepolymer (i) and chain lengthening agent (ii) is mixed with a sufficient quantity of water to produce a solution or dispersion having a solids content of from about 40 to 60% by weight.

14. The process of claim 13 wherein the water is at a temperature of from about 0° to 90° C.

15. The aqueous polyurethane solutions or dispersions produced by the process of claim 7.

16. A process for the preparation of aqueous solutions or dispersions of polyurethanes prepared by the reaction of prepolymers which have at least two free isocyanate groups and contain either chemically fixed hydrophilic groups and/or external emulsifiers which are not chemically fixed, with chain lengthening agents in the aqueous phase, characterized in that the isocyanate prepolymer which is hydrophilically modified and/or contains an external emulsifier is mixed with hydrazone chain lengthening agents in the absence of water, and the resulting mixture is then mixed with water, before significant increases in viscosity occur.

17. A process for the preparation of aqueous solutions or dispersions comprising:
(A) mixing in the absence of water
  (i) a hydrophilic isocyanate prepolymer having
    (a) an average isocyanate functionality of from about 1.8 to 2.2;
    (b) its hydrophilic properties contributed by dispersing centers selected from the group consisting of chemically incorporated cationic or anionic groups present in from about 0 to 100 milliequivalents per 100 g of isocyanate prepolymer, chemically incorporated ethylene oxide units present in the isocyanate prepolymer in from about 0 to 30% by weight, based on the weight of the isocyanate prepolymer, and external emulsifiers present in about 0 to 30% by weight, based on the weight of the isocyanate prepolymers; and
    (c) an average molecular weight of from about 500 to 10,000
  (ii) with an at least partially blocked hydrazone chain lengthening agent which forms hydrazine under the hydrophilic influence of water to form a mixture, and
(B) mixing the mixture of (A), before significant increases in viscosity occur, with water to release the hydrazine and chain lengthen the prepolymer.

18. The process of claim 7 or 17 wherein the hydrophilic properties of the prepolymer are contributed by dispersing centers selected from the group consisting of chemically incorporated cationic or anionic groups present in from about 0.1 to 100 milliequivalents per 100 g of isocyanate prepolymer and chemically incorporated ethylene oxide units present in the isocyanate prepolymer in from about 0.5 to 30% by weight, based on the weight of the isocyanate prepolymer.

* * * * *

UNITED STATES PATENT AND TRADEMARK OFFICE
CERTIFICATE OF CORRECTION

PATENT NO. : 4,269,748
DATED : May 26, 1981
INVENTOR(S) : Klaus Nachtkamp, Josef Pedain, Jurgen Grammel It is certified that error appears in the above-identified patent and that said Letters Patent are hereby corrected as shown below:

Please add the following documents to the listing of References Cited 56 on the first page of the patent:

56 References Cited

U.S. Patent Documents

| | | | |
|---|---|---|---|
| 3,756,992 | 9/4/73 | Dieterich | 260/77.5 |
| 3,461,103 | 8/12/69 | Keberle et al | 260/75 |
| 3,480,592 | 11/25/69 | Dieterich et al | 260/77.5 |
| 3,686,108 | 8/22/72 | Reiff et al | 260/29.2 |
| 4,108,814 | 8/22/78 | Reiff et al | 260/29.2 |
| 3,388,087 | 6/11/68 | Dieterich et al | 260/29.2 |

Foreign Patent Documents

| | | | |
|---|---|---|---|
| 1,184,946 | 9/2/65 | Germany | C08g |
| 1,178,586 | 3/16/67 | Germany | C08g-22/04 |
| 1,237,306 | 9/28/67 | Germany | C08g-22/04 |
| 1,495,745 | 6/4/69 | Germany | C08g-18-08 |
| 1,595,602 | 9/18/69 | Germany | C08g-22/04 |
| 2,019,324 | 12/23/71 | Germany | C08g-22/00 |
| 1,044,405 | 5/14/59 | Germany | C08g |

Signed and Sealed this

Twenty-ninth Day of September 1981

[SEAL]

Attest:

GERALD J. MOSSINGHOFF

Attesting Officer

Commissioner of Patents and Trademarks